US007706508B2

(12) United States Patent
Arenson et al.

(10) Patent No.: US 7,706,508 B2
(45) Date of Patent: *Apr. 27, 2010

(54) X-RAY FLUX MANAGEMENT DEVICE

(75) Inventors: Jerome Stephen Arenson, Haifa (IL); David Ruimi, Netanya (IL); Oded Meirav, Haifa (IL); Robert Harry Armstrong, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/871,200

(22) Filed: Oct. 12, 2007

(65) Prior Publication Data

US 2008/0043924 A1 Feb. 21, 2008

Related U.S. Application Data

(63) Continuation of application No. 11/164,121, filed on Nov. 10, 2005, now Pat. No. 7,330,535.

(51) Int. Cl.
*G21K 3/00* (2006.01)
*G21K 1/04* (2006.01)
*G01D 5/36* (2006.01)

(52) U.S. Cl. ........................ 378/158; 378/160; 250/233

(58) Field of Classification Search ......... 378/156–160; 250/232, 233

See application file for complete search history.

(56) References Cited

U.S. PATENT DOCUMENTS 3,113,214 A 12/1963 Fumas, Jr.
3,974,386 A 8/1976 Mistretta et al.
4,399,550 A * 8/1983 Hauck et al. .................... 378/5
4,780,897 A 10/1988 McDaniel et al.
5,107,529 A * 4/1992 Boone ........................ 378/157
5,165,100 A 11/1992 Hsieh et al.
5,552,606 A * 9/1996 Jones et al. ............ 250/363.04
5,835,555 A * 11/1998 Barry et al. ................. 378/146
5,838,758 A * 11/1998 Krug et al. ..................... 378/53
6,157,703 A * 12/2000 Solomon et al. ............ 378/158
6,434,219 B1 * 8/2002 Rothschild et al. .......... 378/160
6,597,758 B1 7/2003 Rosner
6,836,535 B2 12/2004 Toth et al.
6,990,171 B2 1/2006 Toth et al.
7,031,434 B1 4/2006 Saunders et al.
7,149,278 B2 12/2006 Arenson et al.
7,254,623 B1 8/2007 Toth
7,260,171 B1 8/2007 Arenson et al.
7,260,174 B2 8/2007 Hoffman et al.
7,330,535 B2 * 2/2008 Arenson et al. ............. 378/158
2002/0191751 A1 12/2002 Bogatu et al.
2003/0091508 A1 5/2003 Salb (Continued)

*Primary Examiner*—Edward J Glick
*Assistant Examiner*—Anastasia Midkiff
(74) *Attorney, Agent, or Firm*—Ziolkowski Patent Solutions Group, SC

(57) ABSTRACT

The invention is directed to an x-ray flux management device that adaptively attenuates an x-ray beam to limit the incident flux reaching a subject and radiographic detectors in potentially high-flux areas while not affecting the incident flux and detector measurements in low-flux regions. While the invention is particularly well-suited for CT, the invention is also applicable with other x-ray imaging systems. In addition to reducing the required detector system dynamic range, the present invention provides an added advantage of reducing radiation dose.

16 Claims, 6 Drawing Sheets

U.S. PATENT DOCUMENTS

2003/0199757 A1 10/2003 Toth et al.
2004/0234021 A1 11/2004 Hoffman
2004/0264627 A1 12/2004 Besson
2005/0089135 A1 4/2005 Toth et al.
2005/0089136 A1 4/2005 Toth et al.
2005/0089137 A1 4/2005 Toth et al.
2005/0089138 A1 4/2005 Toth et al.
2005/0089146 A1 4/2005 Toth et al.
2006/0109949 A1 5/2006 Tkaczyk et al.
2006/0109950 A1 5/2006 Arenson et al.
2007/0092066 A1 4/2007 Tkaczyk et al.

* cited by examiner

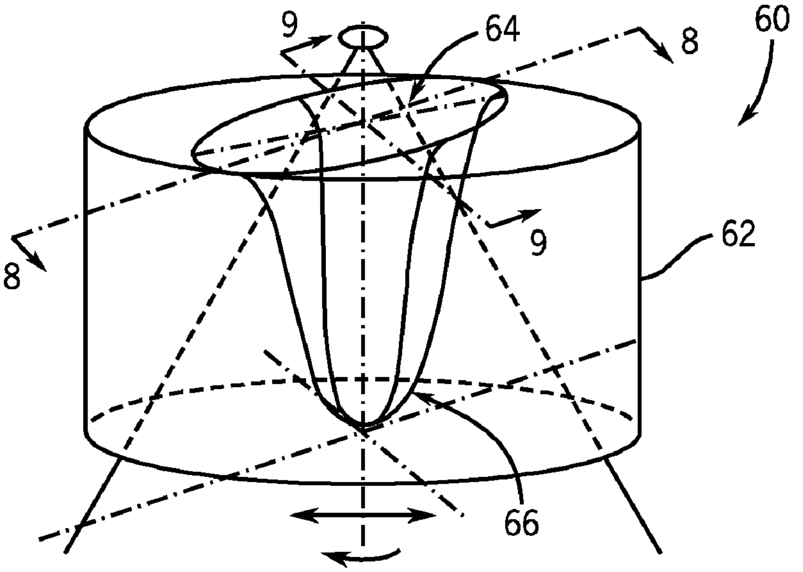
FIG. 7
FIG. 8
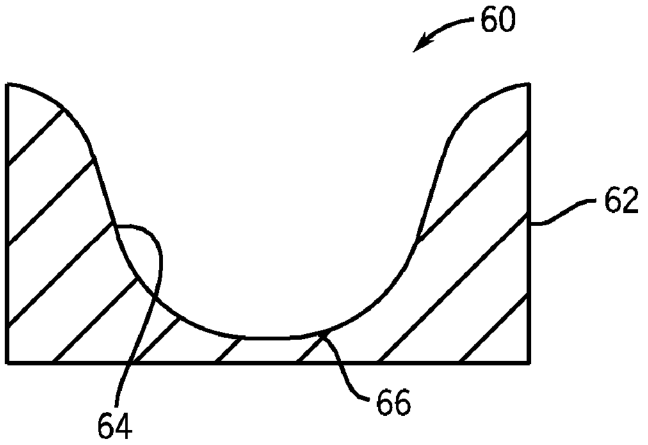
FIG. 9
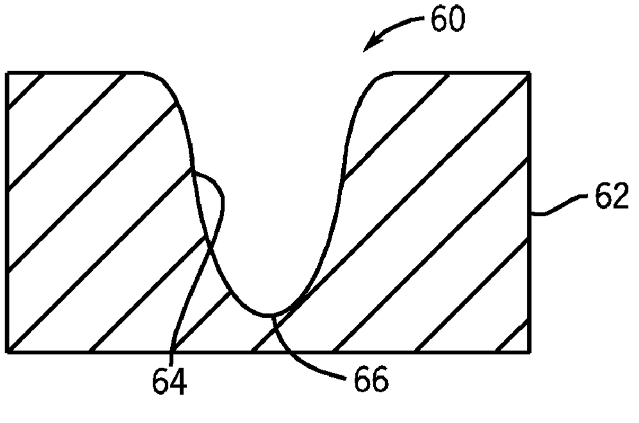

X-RAY FLUX MANAGEMENT DEVICE

CROSS-REFERENCE TO RELATED APPLICATION

The present application is a continuation of and claims priority of U.S. Ser. No. 11/164,121 filed Nov. 10, 2005, the disclosure of which is incorporated herein by reference.

BACKGROUND OF THE INVENTION

The present invention relates generally to radiographic imaging and, more particularly, to a beam chopper for a radiographic imaging system. The invention is also directed to an x-ray filter. The present invention is particularly related to photon counting and/or energy discriminating radiation detectors.

Typically, in radiographic systems, an x-ray source emits x-rays toward a subject or object, such as a patient or a piece of luggage. Hereinafter, the terms "subject" and "object" may be interchangeably used to describe anything capable of being imaged. The x-ray beam, after being attenuated by the subject, impinges upon an array of radiation detectors. The intensity of the radiation beam received at the detector array is typically dependent upon the attenuation of the x-rays through the scanned object. Each detector element of the detector array produces a separate signal indicative of the attenuated beam received by each detector element. The signals are transmitted to a data processing system for analysis and further processing which ultimately produces an image. Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

In a similar fashion, radiation detectors are employed in emission imaging systems such as used in nuclear medicine (NM) gamma cameras and Positron Emission Tomography (PET) systems. In these systems, the source of radiation is no longer an x-ray source, rather it is a radiopharmaceutical introduced into the body being examined. In these systems each detector of the array produces a signal in relation to the localized intensity of the radiopharmaceutical concentration in the object. Similar to conventional x-ray imaging, the strength of the emission signal is also attenuated by the interlying body parts. Each detector element of the detector array produces a separate signal indicative of the emitted beam received by each detector element. The signals are transmitted to a data processing system for analysis and further processing which ultimately produces an image.

In most computed tomography (CT) imaging systems, the x-ray source and the detector array are rotated about a gantry encompassing an imaging volume around the subject. X-ray sources typically include x-ray tubes, which emit the x-rays as a fan or cone beam from the anode focal point. X-ray detector assemblies typically include a collimator for reducing scattered x-ray photons from reaching the detector, a scintillator adjacent to the collimator for converting x-rays to light energy, and a photodiode adjacent to the scintillator for receiving the light energy and producing electrical signals therefrom. Typically, each scintillator of a scintillator array converts x-rays to light energy. Each photodiode detects the light energy and generates a corresponding electrical signal. The outputs of the photodiodes are then transmitted to the data acquisition system and then to the processing system for image reconstruction.

Conventional CT imaging systems utilize detectors that convert x-ray photon energy into current signals that are integrated over a time period, then measured and ultimately digitized. A drawback of such detectors is their inability to provide independent data or feedback as to the energy and incident flux rate of photons detected. That is, conventional CT detectors have a scintillator component and photodiode component wherein the scintillator component illuminates upon reception of x-ray photons and the photodiode detects illumination of the scintillator component, and provides an integrated electrical current signal as a function of the intensity and energy of incident x-ray photons. While it is generally recognized that CT imaging would not be a viable diagnostic imaging tool without the advancements achieved with conventional CT detector design, a drawback of these integrating detectors is their inability to provide energy discriminatory data or otherwise count the number and/or measure the energy of photons actually received by a given detector element or pixel. Accordingly, recent detector developments have included the design of an energy discriminating detector that can provide photon counting and/or energy discriminating feedback. In this regard, the detector can be caused to operate in an x-ray counting mode, an energy measurement mode of each x-ray event, or both.

These energy discriminating detectors are capable of not only x-ray counting, but also providing a measurement of the energy level of each x-ray detected. While a number of materials may be used in the construction of an energy discriminating detector, including scintillators and photodiodes, direct conversion detectors having an x-ray photoconductor, such as amorphous selenium or cadmium zinc telluride, that directly convert x-ray photons into an electric charge have been shown to be among the preferred materials. A drawback of photon counting detectors, however, is that these types of detectors have limited count rates and have difficulty covering the broad dynamic ranges encompassing very high x-ray photon flux rates typically encountered with conventional CT systems. Generally, a CT detector dynamic range of 1,000,000 to one is required to adequately handle the possible variations in photon flux rates. In the very fast scanners now available, it is not uncommon to encounter x-ray flux rates of over $10^8$ photons/mm$^2$/sec when no object is in the scan field, with the same detection system needing to count only 10's of photons that manage to traverse the center of large objects.

The very high x-ray photon flux rates ultimately lead to detector saturation. That is, these detectors typically saturate at relatively low x-ray flux levels. This saturation can occur at detector locations wherein small subject thickness is interposed between the detector and the radiographic energy source or x-ray tube. It has been shown that these saturated regions correspond to paths of low subject thickness near or outside the width of the subject projected onto the detector array. In many instances, the subject is more or less cylindrical in the effect on attenuation of the x-ray flux and subsequent incident intensity to the detector array. In this case, the saturated regions represent two disjointed regions at extremes of the detector array. In other less typical, but not rare instances, saturation occurs at other locations and in more than two disjointed regions of the detector. In the case of a cylindrical subject, the saturation at the edges of the array can be reduced by the imposition of a bowtie filter between the subject and the x-ray source. Typically, the filter is constructed to match the shape of the subject in such a way as to equalize total attenuation, filter and subject, across the detector array. The flux incident to the detector is then relatively uniform across the array and does not result in saturation. What can be problematic, however, is that the bowtie filter may not be optimum given that a subject population is significantly less than uniform and not exactly cylindrical in shape nor centrally located in the x-ray beam. In such cases, it is possible for one or more disjointed regions of saturation to occur or conversely to over-filter the x-ray flux and unnecessarily create regions of very low flux. Low x-ray flux in the projection results in a reduction in information content which will ultimately contribute to unwanted noise in the reconstructed image of the subject.

Moreover, a system calibration method common to most CT systems involves measuring detector response with no subject whatsoever in the beam. This "air cal" reading from each detector element is used to normalize and correct the preprocessed data that is then used for CT image reconstruction. Even with ideal bowtie filters, high x-ray flux now in the central region of the detector array could lead to detector saturation during the system calibration phase.

A number of imaging techniques have been proposed to address saturation of any part of the detector. These techniques include maintenance of low x-ray flux across the width of a detector array, for example, by modulating tube current or x-ray voltage during scanning. However, this solution leads to increased scanned time. That is, there is a penalty that the acquisition time for the image is increased in proportion to the nominal flux needed to acquire a certain number of x-rays that meet image quality requirements. Other solutions include the implementation of over-range algorithms that may be used to generate replacement data for the saturated data. However, these algorithms may imperfectly replace the saturated data as well as contribute to the complexity of the CT system.

It would therefore be desirable to design an x-ray flux management device that is effective in reducing detector saturation under high x-ray flux conditions while not compromising data acquisition under low x-ray flux conditions.

BRIEF DESCRIPTION OF THE INVENTION

The present invention is a directed an x-ray flux management device that overcomes the aforementioned drawbacks.

The impact of radiographic detector design on radiographic image quality is foremost an issue of properly handling low-flux conditions (to effectively measure the limited x-ray transmission through thicker imaging regions). At the same time, the higher flux areas in these scans (such as detector readings through air and partially within the subject contours) also need to be correctly evaluated. If insufficient detector dynamic range is available, these high-flux detector channels tend to over-range and enter a saturated state. Since these over-range areas are typically in air or in highly irradiated portions of the subject, the exact measurement of each photon in these high-flux regions is not as critical as for the low-flux areas where each photon contributes an integral part to the total collected photon statistics and improved imaging quality. Subsequently, the invention addresses the specific needs of low- and high-flux regions and thereby provides the opportunity to use low dynamic range detectors for radiographic imaging.

In this regard, the invention includes an x-ray flux management device that adaptively attenuates an x-ray beam to limit the incident flux reaching the subject and the radiographic detectors in the potentially high-flux areas while not affecting the incident flux and detector measurements in low-flux regions. While the invention is particularly well-suited for CT, the invention is also applicable with other x-ray imaging systems. In addition to reducing the required detector system dynamic range, the present invention provides an added advantage of reducing radiation dose.

Therefore, in accordance with one aspect, the invention includes an x-ray beam chopper for a radiographic imaging apparatus. The beam chopper has a rotatable frame and at least one x-ray transmission window disposed in the rotatable frame that allows a generally free transmission of x-rays. The chopper also has at least one x-ray filtering window disposed in the rotatable frame that filters x-rays.

In accordance with another aspect, the invention is directed to a radiographic imaging apparatus that includes an x-ray source and an x-ray detector. The apparatus further has a segmented filtering assembly having a generally annular frame with at least one low x-ray flux segment and at least one high x-ray flux segment, and a filtering assembly controller that causes the low x-ray flux segment to be in an x-ray beam path during a low x-ray flux data acquisition view and causes the high x-ray flux segment to be in the x-ray beam path during a high x-ray flux data acquisition view.

According to another aspect, the invention includes an x-ray filter having a 3D semi-cylindrical rotatable filter body formed of x-ray attenuating matter. The filter also has a semi-conical bore formed in the 3D semi-cylindrical rotatable filter. The semi-conical bore has an elliptically shaped base.

According to yet another aspect, the invention includes an x-ray filter assembly having a bowtie filter having an effective beam profile. The assembly further has a filter controller that tilts the bowtie filter during data acquisition to change the effective beam profile during data acquisition.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 7 is a perspective view of a 3D bowtie filter according to the present invention.

FIG. 8 is a cross-sectional view of the bowtie filter of FIG. 7 taken along line 8-8 thereof.

FIG. 9 is a cross-sectional view of the bowtie filter of FIG. 7 taken along line 9-9 thereof.

DETAILED DESCRIPTION OF THE PREFERRED EMBODIMENT

The operating environment of the present invention is described with respect to a four-slice computed tomography (CT) system. However, it will be appreciated by those skilled in the art that the present invention is equally applicable for use with single-slice or other multi-slice configurations. Moreover, the present invention will be described with respect to the detection and conversion of x-rays. However, one skilled in the art will further appreciate that the present invention is equally applicable for the detection and conversion of other high frequency electromagnetic energy.

Figure 1:
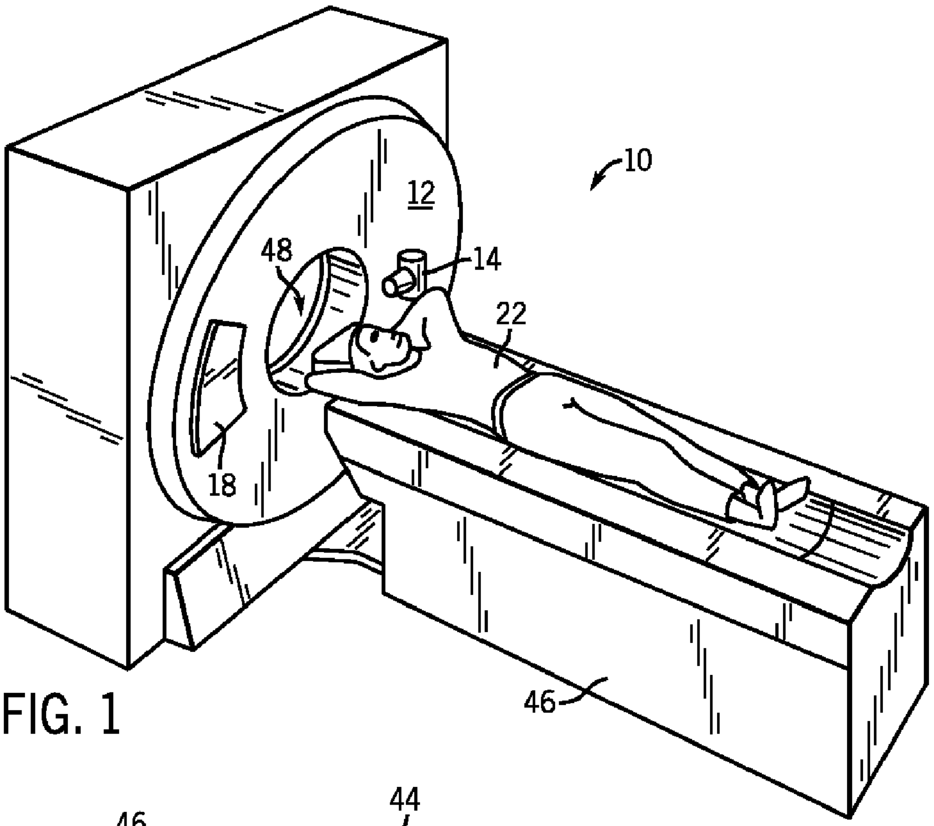
FIG. 1 is a pictorial view of a CT imaging system.
Figure 2:
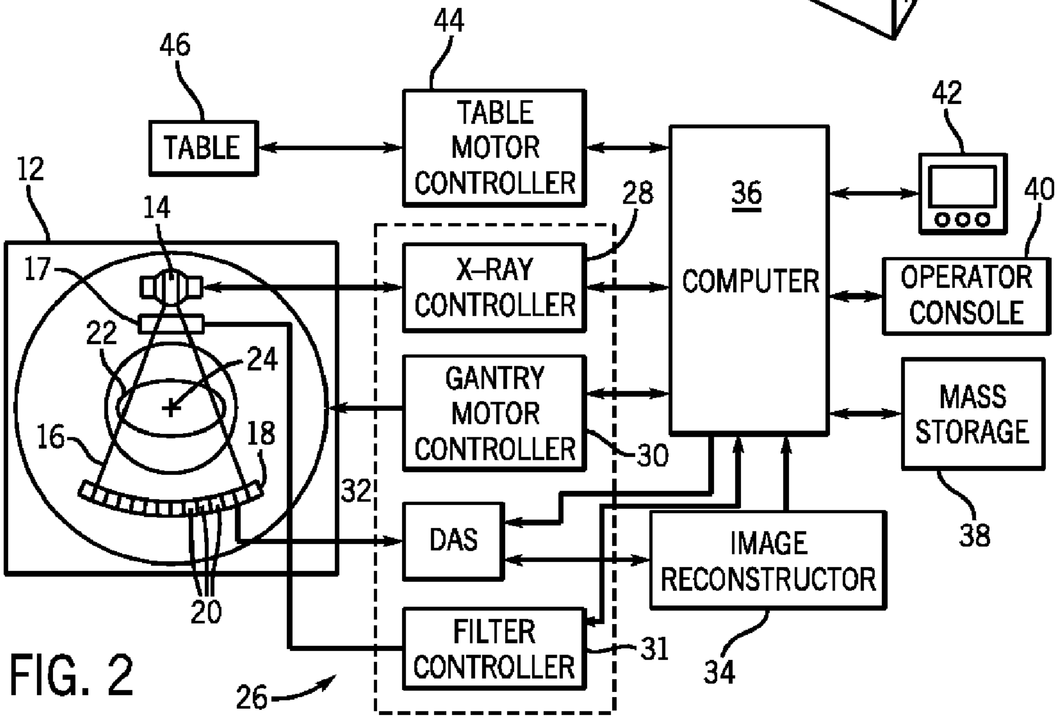
FIG. 2 is a schematic diagram of the system illustrated in FIG. 1.

Referring to FIGS. 1 and 2, an exemplary computed tomography (CT) imaging system 10 is shown as including a gantry 12 representative of a "third generation" CT scanner. Gantry 12 has an x-ray source 14 that projects a beam of x-rays 16 through an x-ray flux management assembly 17 toward a detector array 18 on the opposite side of the gantry 12. The x-ray flux management assembly will be described in greater detail with respect to FIGS. 3-12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28, gantry motor controller 30, and filter controller 31. In addition, computer 36 operates a table motor controller 44 which controls a motorized table 46 to position patient 22 and gantry 12. Particularly, table 46 moves portions of patient 22 through a gantry opening 48.

The present invention is directed to an x-ray beam chopper that may be incorporated with the CT system described above or other radiographic systems, such as x-ray systems and the like.

Generally, high-sensitivity photon counting radiation detectors are constructed to have a relatively low dynamic range. This is generally considered acceptable for proton counting detector applications since high flux conditions typically do not occur. In CT detector designs, low flux detector readings through the subject are typically accompanied by areas of high irradiation in air, and/or within the contours of the scan subject requiring CT detectors to have very large dynamic range responses. Moreover, the exact measurement of photons in these high-flux regions is less critical than that for low-flux areas where each photon contributes an integral part to the total collected photon statistics. Notwithstanding that the higher flux areas may be of less clinical or diagnostic value, images reconstructed with over-ranging or saturated detector channel data can be prone to artifacts. As such, the handling of high-flux conditions is also important.

The present invention includes an x-ray flux management device designed to prevent saturation of photon counting x-ray systems having detector channels characterized by low dynamic range. Dynamic range of a detector channel defines the range of x-ray flux levels that the detector channel can handle to provide meaningful data at the low-flux end and not experience over-ranging or saturating at the high flux end. Notwithstanding the need to prevent over-ranging, to provide diagnostically valuable data, the handling of low-flux conditions, which commonly occur during imaging through thicker cross-sections and other areas of limited x-ray transmission, is also critical in detector design. As such, the x-ray flux management device described herein is designed to satisfy both high flux and low flux conditions.

Figure 3:
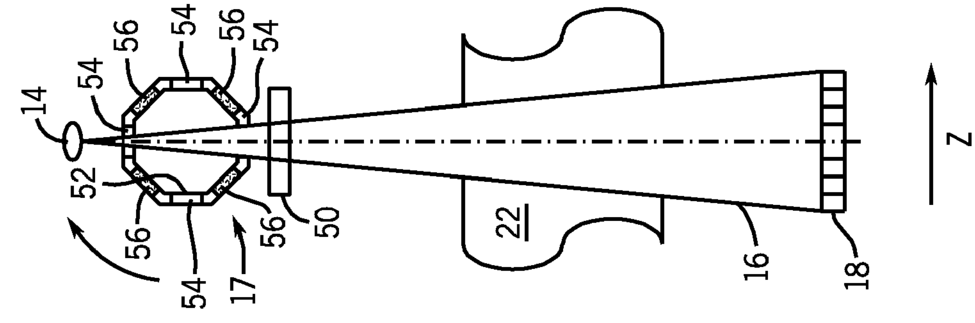
FIG. 3 is a schematic diagram of an x-ray beam chopper positioned relative to the z-axis according to the present invention.

Referring now to FIG. 3, an x-ray flux management device according to one embodiment of the invention is shown. As illustrated, the device 17, which is shown relative to the z-axis or long axis of subject 22, is operative as an x-ray beam chopper that is positioned between x-ray tube 14 and z-plane collimator 50. In a preferred embodiment, the beam chopper 17 has a generally annular frame or tube 52 with two types of windows alternatively arranged along an outer rim thereof. In the illustrated exemplary embodiment, the generally annular frame is polygonal. One type of window is a transmission window 54 that provides unobstructed transmission of x-rays 16 and, as such, is designed to be placed in the x-ray beam path during low x-ray flux conditions, e.g. when a thicker subject cross-section is being imaged. The other window type is an x-ray filtering window 56 that filters or attenuates x-rays 16 when placed in the x-ray beam path and, as such, is designed to be placed in the x-ray beam path during high x-ray flux conditions, e.g. when a thinner subject cross-section is being imaged. In one embodiment, each x-ray filtering window 56 is composed of a block of x-ray filtering or attenuating material with holes (not shown) formed therein. The x-ray transmission windows 54 are preferably constructed to not effect the energy of the x-ray beam.

In the exemplary embodiment of FIG. 3, the beam chopper has an octagonal frame. In this regard, the chopper is constructed to have four x-ray transmission windows 54 and four x-ray filtering windows 56. With this construction, the x-ray transmission windows 54 and x-ray filtering windows are alternately formed about the frame. As such, each x-ray transmission window is adjacent a pair of x-ray filtering windows.

As further illustrated in FIG. 3, the transmission x-ray and x-ray filtering windows 54, 56 are arranged relative to or integrally formed within frame 52 such that the x-ray beam 16 passes through a pair of transmission windows 54 or a pair of filtering windows 56. With this orientation, transition times between adjacent windows are advantageously reduced. For example, for an octagonal beam chopper having four x-ray transmission windows and four x-ray filtering windows of substantially equal size, only a one-quarter rotation per data acquisition view is required. As such, a rotational speed of 30,000 rpm for one-half second scanners having 1,000 views per 360 degrees of acquisition is possible.

As described above, the x-ray transmission windows 54 are placed in the x-ray beam path when the current data acquisition view is from a thicker subject cross-section. Conversely, the x-ray filtering windows 56 are placed in the x-ray beam path when the current data acquisition view is from a thinner subject cross-section. Accordingly, rotation of the chopper is dynamically controlled by controller 31, FIG. 2, to provide synchronization between chopper rotation and data acquisition. In this regard, it is contemplated that the chopper may be caused to rotate continuously at a fixed rotational speed or at a variable rotational speed. Additionally, it contemplated that the chopper may be initially held stationary with x-ray transmission windows placed in the x-ray beam. In this regard, saturation of the x-ray detector can be monitored and if the detector is at or near saturation, the chopper can be incrementally rotated such that x-ray filtering windows are placed in the x-ray path. For the next acquisition, the chopper is again rotated such that x-ray transmission windows are placed in the x-ray beam path. Saturation is again monitored and, if need be, a subsequent incremental rotation of the chopper. Accordingly, x-ray filtering windows are not placed in the x-ray beam path unless saturation is imminent or has occurred.

Figure 4:
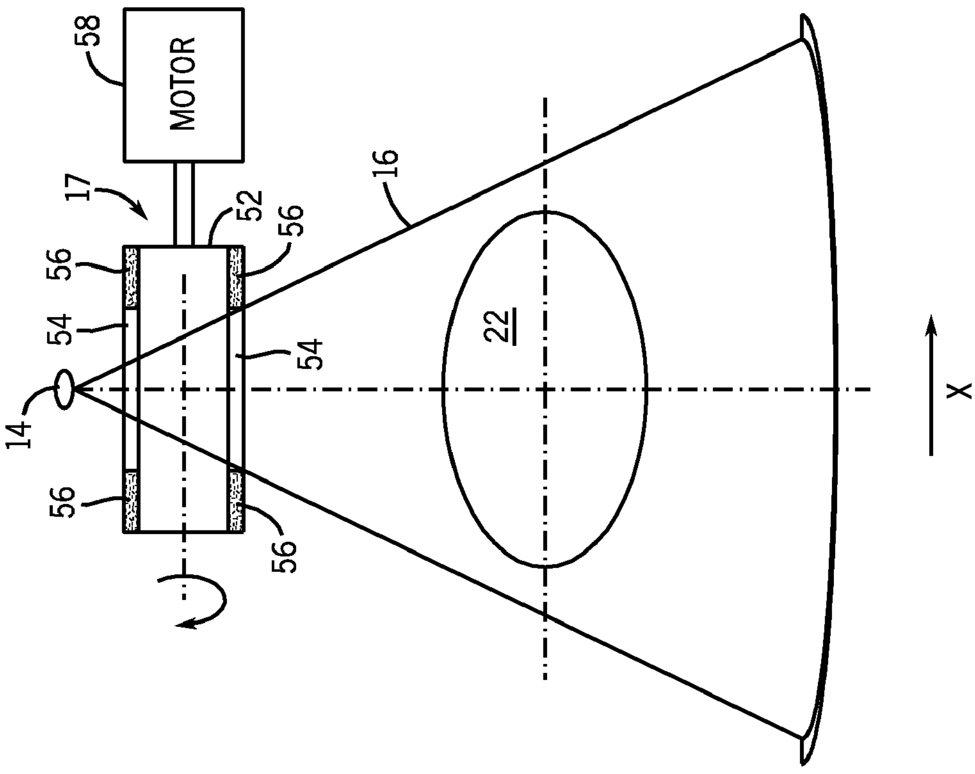
FIG. 4 is a schematic diagram of an x-ray beam chopper positioned relative to the x-axis according to the present invention.

Referring now to FIG. 4, position of the beam chopper 17 relative to the x-axis of subject 22 is illustrated. For purposes of simplicity, collimator 50, FIG. 3, is not shown. As illustrated, for the current data acquisition view, a pair of low x-ray flux or x-ray transmission windows 54 is positioned in the x-ray beam 16. At high x-ray flux conditions, the beam chopper 17 will be rotated by motor 58 to rotate x-ray filtering windows 56 into the x-ray beam path 16. In addition to rotating the beam chopper, it is contemplated that motor 58 may translate the beam chopper in the x-direction to accommodate asymmetrical subjects and variations in subject contours. In one preferred embodiment, motor 58 is a stepper motor.

Figure 5:
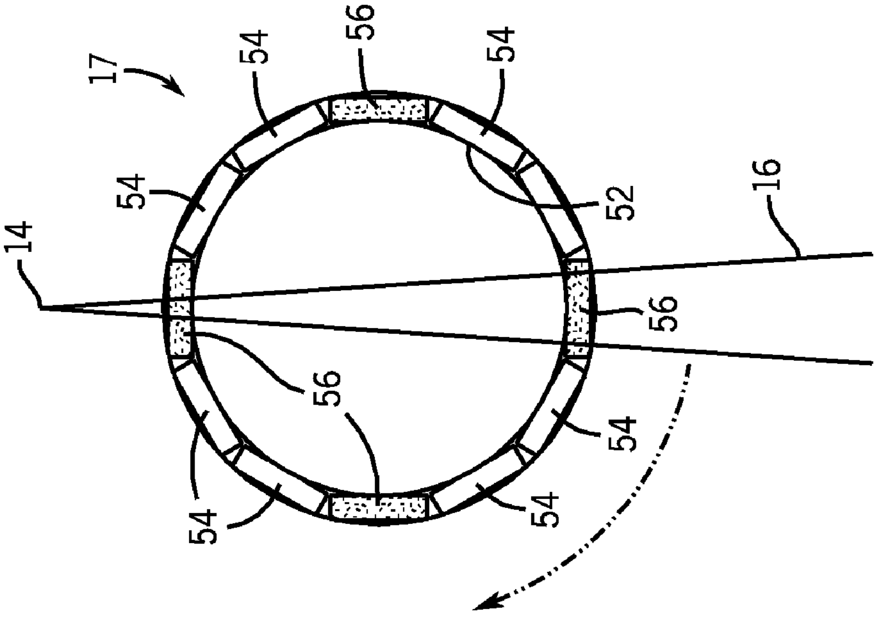
FIG. 5 is a schematic of an x-ray beam chopper according to an alternate embodiment of the present invention.

Referring now to FIG. 5, an alternate embodiment of beam chopper 17 is illustrated. In the illustrated embodiment, there are more x-ray transmission windows 54 than x-ray filtering windows 56. As shown, there is a 2:1 relationship between the number of x-ray transmission windows and the number of x-ray filtering windows. In this regard, only every third view would be attenuated if the beam chopper is continuously rotated. Accordingly, there is not an alternating between high x-ray flux views and low x-ray flux views as in the embodiment illustrated in FIG. 3. One skilled in the art will appreciate that such a 2:1 relationship between transmission and filtering views may be equivalently achieved with a chopper having equal number of transmission and filtering windows, but through variable rotational speed of the chopper such that the transmission windows are in the x-ray beam twice as long as the filtering windows.

Also, it is contemplated that the beam chopper 17 may be constructed such that every Nth view is attenuated. In this regard, it is contemplated that the beam chopper can be designed to have NX transmission windows, where N is a number greater than one and X is the number of filtering windows.

Figure 6:
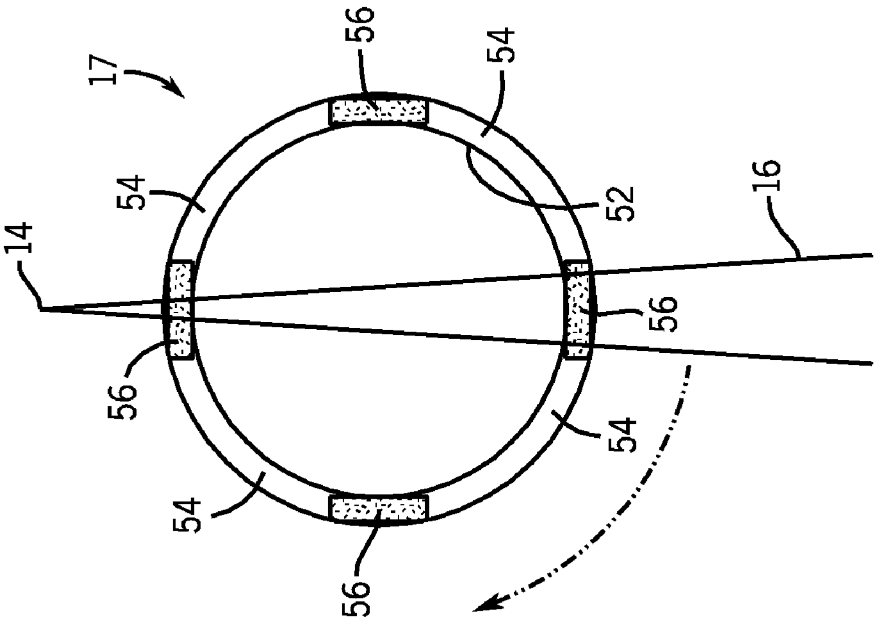
FIG. 6 a schematic of an x-ray beam chopper according to yet another alternate embodiment of the present invention.

Referring now to FIG. 6, another embodiment of the beam chopper is illustrated. Similar to that illustrated in FIGS. 3 and 5, the beam chopper of FIG. 6 also has a generally annular frame 52 about which x-ray transmission windows 54 and x-ray filtering windows 56 are formed. Unlike the polygonal constructions previously described, the beam chopper 17 of FIG. 6 has a fixed radius. Notwithstanding this distinction, operation of the filter is similar to that previously described. The beam chopper 17 is rotated such that x-ray transmission windows 52 are in the x-ray beam path 16 during low x-ray flux conditions and x-ray filtering windows 54 are in the x-ray beam path 16 during high x-ray flux conditions. In the exemplary beam chopper illustrated in FIG. 6, there is a 1:1 relationship between transmission windows and filtering windows; however, it is contemplated that the beam chopper may have less than or more than a 1:1 ratio.

As described above, it is contemplated that detector saturation readings may be acquired for a given view and if the detector has saturated (or will saturate), the beam chopper can be caused to rotate to place x-ray filtering windows in the x-ray beam. Thus, it is contemplated that for a saturated or near-saturated view, data may be acquired with the x-ray filtering windows in the x-ray beam path and that data can be used not only for image reconstruction but to correct the otherwise saturated data.

Additionally, while the beam chopper has been described such that either two x-ray transmission windows or two x-ray filtering windows are in the x-ray beam at any given moment, it is contemplated that the beam chopper may be constructed such that only one transmission or only one filtering window is in the beam path. That is, it is contemplated that the windows may be formed on a hemispherical frame such that through pendulum-like translation, different attenuation profiles may be presented. In this regard, it is further contemplated that more than two types of windows may be supported by the frame. The invention contemplates that various windows of different attenuation power may be supported by the frame whereby the continuum of attenuation windows ranges from a free transmission window of zero attenuation to a maximum attenuation window. Moreover, it is contemplated that such a hemispherical frame could be caused to rotate clockwise as well as counter-clockwise and at a fixed or variable speed. Additionally, it is contemplated that a mechanical shutter of x-ray filtering material may be dynamically presented in the x-ray beam during high x-ray flux conditions.

The present invention also includes an inventive bowtie filter. Standard bowtie filters have a symmetrical, one-dimensional shape. To overcome limitations associated with these standard bowtie filters, the present invention is also directed to a 3D semi-cylindrical rotatatable bowtie filter. This multi-dimensional filter 60, shown in FIG. 7, has a cylindrical frame 62 with a semi-conic bore 64 formed therein. The bore 64 has an elliptical base 66. This is in stark contrast to conventional bowtie filters which have a circular base. Additionally, also in contrast to conventional bowtie filters, filter 60 is not symmetrical. This is illustrated by the cross-sectional views of FIGS. 8 and 9.

Referring now to FIG. 8, cross-sectional views of filter 60 taken along lines 8-8 and lines 9-9, respectively, are shown. As illustrated, filter 60 is constructed to have a bore 64 formed within frame 62. The width of the bore 64 cut along line 8-8, however, is greater than that of bore cut along line 9-9. This results in a different absorption profile for any rotational angle of the filter 60. Also, it is contemplated that the filter may be dynamically repositioned during data acquisition so that the resulting profile can be matched to the subject's body and, in particular, centered for non-centered subjects. In this regard, it is contemplated that precise positioning of the subject can be measured and used to control translation of the filter. Precise positioning can be determined from positioning sensors, scout scan data, and the like. By doing so, the present invention supports rotation and translation of the filter during data acquisition to track subject profile. It is also contemplated that multiple filters in a stacked arrangement could be used and moved in tandem or independently to achieve a desired attenuation profile. This can be particularly advantageous when imaging two legs and other anatomical structures that require a relatively complex attenuation profile.

Figure 11:
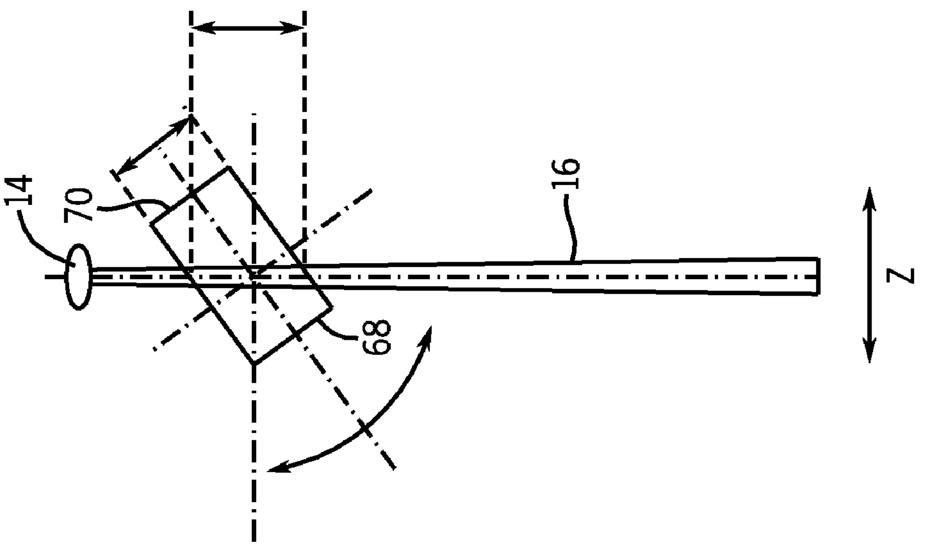
FIG. 11 is a schematic view of the tiltable bowtie filter of FIG. 10 shown relative to the z-axis according to the present invention.
Figure 10:
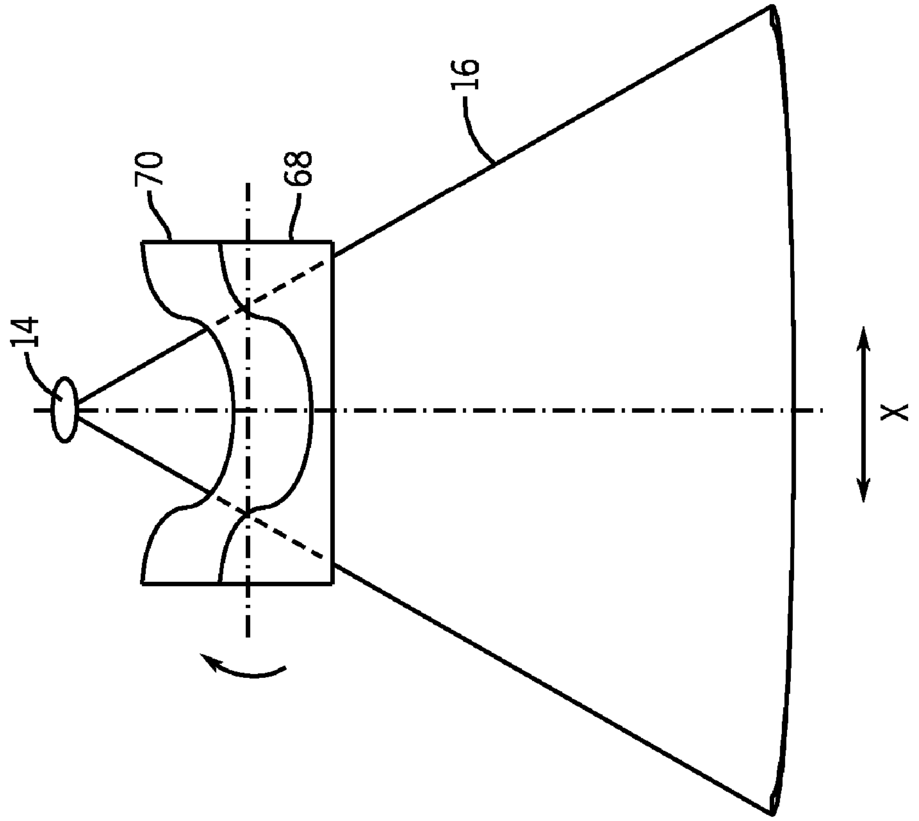
FIG. 10 is a schematic view of a tiltable bowtie filter assembly positioned relative to the x-axis according to the present invention.

Referring now to FIGS. 10-11, a filter assembly in accordance with another embodiment of the present invention is shown. In this embodiment, a pair of bowtie filters 68, 70 are shown relative to the x-axis and in x-ray beam 16. Each filter 68, 70 is thicker in the z-direction than conventional bowtie filters. In contrast to conventional bowtie filters, however, filter 68, 70 are designed to be tilted by a tilt mechanism (not shown) to effectively change the attenuation profile of the filters. In addition to being tilted, the filters may also be moved laterally in the x-direction to better match a given subject's contours or accommodate a non-centered subject. Additionally, while two filters stacked on top of another are shown, it is contemplated that less than two or more than two filters may be used.

As illustrated in FIG. 11, filters 68, 70 are tiltable relative to the z-axis. In this regard, the attenuation profile generated by the filters 68, 70 can be dynamically controlled to match a desired attenuation profile. The tilt angle (and translation) position of the bowtie filters can be changed during data acquisition to track a given subject profile. In a preferred embodiment, the filters can be tilted a maximum ninety degrees. This ninety degree tilt range defines a minimum absorption profile at zero degrees to a maximum absorption profile at ninety degrees.

Figure 12:
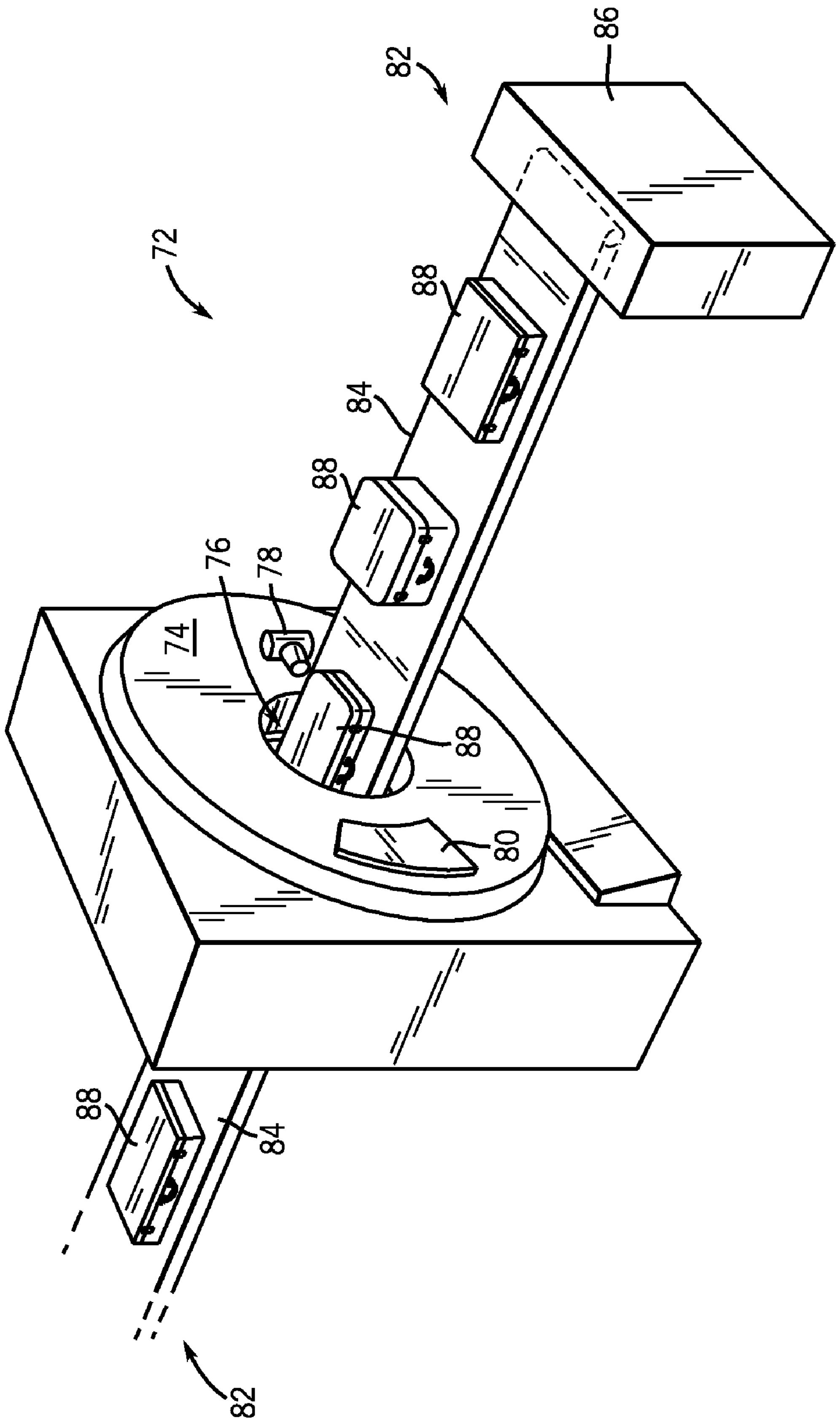
FIG. 12 is a pictorial view of a CT system for use with a non-invasive package inspection system.

Referring now to FIG. 12, package/baggage inspection system 72 includes a rotatable gantry 74 having an opening 76 therein through which packages or pieces of baggage may pass. The rotatable gantry 74 houses a high frequency electromagnetic energy source 78 as well as a detector assembly 80. A conveyor system 82 is also provided and includes a conveyor belt 84 supported by structure 86 to automatically and continuously pass packages or baggage pieces 88 through opening 76 to be scanned. Objects 88 are fed through opening 76 by conveyor belt 84, imaging data is then acquired, and the conveyor belt 84 removes the packages 88 from opening 76 in a controlled and continuous manner. As a result, postal inspectors, baggage handlers, and other security personnel may non-invasively inspect the contents of packages 88 for explosives, knives, guns, contraband, etc.

Therefore, in accordance with one embodiment, the invention includes an x-ray beam chopper for a radiographic imaging apparatus. The beam chopper has a rotatable frame and at least one x-ray transmission window disposed in the rotatable frame that allows a generally free transmission of x-rays. The chopper also has at least one x-ray filtering window disposed in the rotatable frame that filters x-rays.

In accordance with another embodiment, the invention is directed to a radiographic imaging apparatus that includes an x-ray source and an x-ray detector. The apparatus further has a segmented filtering assembly having a generally annular frame with at least one low x-ray flux segment and at least one high x-ray flux segment, and a filtering assembly controller that causes the low x-ray flux segment to be in an x-ray beam path during a low x-ray flux data acquisition view and causes the high x-ray flux segment to be in the x-ray beam path during a high x-ray flux data acquisition view.

According to another embodiment, the invention includes an x-ray filter having a 3D semi-cylindrical rotatable filter body formed of x-ray attenuating matter. The filter also has a semi-conical bore formed in the 3D semi-cylindrical rotatable filter. The semi-conical bore has an elliptically shaped base.

According to yet another embodiment, the invention includes an x-ray filter assembly having a bowtie filter having an effective beam profile. The assembly further has a filter controller that tilts the bowtie filter during data acquisition to change the effective beam profile during data acquisition.

While the present invention is applicable with a number of radiographic imaging systems, it is particularly well-suited for CT systems and, especially, those systems having detectors with relative small dynamic range, such as photon counting and energy discriminating detectors. In this regard, the present invention is believed to be a key enabler for the use of direct conversion and energy discriminating/photon counting detectors with conventional CT systems. Additionally, as the beam chopper and filters selectively limit radiation exposure, the invention advantageously reduces subject dose without sacrificing image quality.

The present invention has been described in terms of the preferred embodiment, and it is recognized that equivalents, alternatives, and modifications, aside from those expressly stated, are possible and within the scope of the appending claims.

What is claimed is:

1. An x-ray beam chopper for a radiographic imaging apparatus, the chopper comprising:

a rotatable frame having a first length along an axis of rotation, the rotatable frame having a first x-ray transmission window and a second x-ray transmission window opposite the first x-ray transmission window, the first and second transmission windows formed in and passing through a wall of the rotatable frame and having a second length that is less than the first length of the rotatable frame, the first and second windows formed to allow free transmission of x-rays therethrough when the rotatable frame is at a first angular orientation with respect to the imaging apparatus;

wherein the frame comprises four x-ray transmission windows and four x-ray filtering windows, the four x-ray transmission windows including the first x-ray transmission window and the second x-ray transmission window; and wherein the four x-ray filtering windows are integrally formed with the rotatable frame.

2. The x-ray beam chopper of claim 1 wherein the rotatable frame further comprises a first x-ray filtering window and a second x-ray filtering window positioned opposite the first x-ray filtering window formed in the rotatable frame and configured to attenuate x-rays passing therethrough when the rotatable frame is at a second angular orientation with respect to the imaging apparatus.

3. The x-ray beam chopper of claim 2 comprising more x-ray transmission windows than x-ray filtering windows.

4. The x-ray beam chopper of claim 1 wherein the rotatable frame is an octagonal frame.

5. The x-ray beam chopper of claim 1 comprising a 2:1 ratio of x-ray transmission windows to x-ray filtering windows.

6. The x-ray beam chopper of claim 1 configured to be situated between an x-ray tube window and a z-collimator of a CT scanner.

7. A radiographic imaging apparatus comprising:

an x-ray source;

an x-ray detector;

a segmented filtering assembly having a generally annular frame comprising two opposing openings integrally formed in a wall of the frame and two opposing x-ray attenuation segments, the two opposing openings having a length corresponding to a rotational axis thereof that is less than a length of the segmented filtering assembly; and a filtering assembly controller that causes the two opposing openings to be in an x-ray beam path during a low x-ray flux data acquisition view to allow unobstructed passage of x-rays therethrough, and causes the two opposing x-ray attenuation segments to be in the x-ray beam path during a high x-ray flux data acquisition view.

8. The apparatus of claim 7 further comprising a motor operationally connected to the segmented filtering assembly and the filtering assembly controller, and configured to rotate the segmented filtering assembly in response to control commands received from the filtering assembly controller.

9. The apparatus of claim 8 wherein the motor is a stepper motor that incrementally rotates the segmented filtering assembly.

10. The apparatus of claim 8 wherein the motor causes continuous rotation on the filtering assembly.

11. The apparatus of claim 7 further comprising a z-collimator and wherein the segmented filtering assembly is disposed between the x-ray tube and the z-collimator.

12. The apparatus of claim 7 wherein the generally annular frame is a polygon.

13. The apparatus of claim 7 wherein the controller is further configured to initially place the two opposing x-ray transparent passages in an x-ray beam path, receive x-ray detector saturation feedback from the x-ray detector, and if the feedback indicates x-ray detector saturation, then rotate the segmented filtering assembly to position the two opposing x-ray attenuation segments in the x-ray beam path.

14. The apparatus of claim 7 further comprising a rotatable gantry and wherein the x-ray source, the x-ray detector, and the segmented filtering assembly are disposed in the rotatable gantry.

15. A flux management system comprising:

an annular x-ray beam chopper having a wall comprising an inner surface and an outer surface;

at least four windows disposed as pairs of windows opposite each other, the at least four windows formed in the wall, the pairs of windows configured to permit the unimpeded transmission of an x-ray beam;

a pair of filtering windows disposed opposite each other and formed in the wall, the pair of filtering windows configured to filter transmission of an x-ray beam; and a motor configured to rotate the annular x-ray beam chopper.

16. The flux management system of claim 15 comprising a controller configured to monitor saturation of an x-ray detector, and, when saturation of the x-ray detector occurs, to cause the motor to place the pair of filtering windows in the x-ray beam path.

* * * * *